(12) United States Patent
Adrangi et al.

(10) Patent No.: US 12,243,037 B2
(45) Date of Patent: Mar. 4, 2025

(54) METHODS AND ARRANGEMENTS FOR A PERSONAL POINT OF SALE DEVICE

(71) Applicant: Intel Corporation, Santa Clara, CA (US)

(72) Inventors: Farid Adrangi, Lake Oswego, OR (US); Sanjay Bakshi, Portland, OR (US); Amit S. Bodas, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/697,748

(22) Filed: Mar. 17, 2022

(65) Prior Publication Data

US 2022/0245609 A1 Aug. 4, 2022

Related U.S. Application Data

(60) Continuation of application No. 16/202,551, filed on Nov. 28, 2018, now Pat. No. 11,282,057, which is a
(Continued)

(51) Int. Cl.
*G06Q 20/20* (2012.01)
*G07G 1/00* (2006.01)
*G07G 1/14* (2006.01)

(52) U.S. Cl.
CPC ......... *G06Q 20/202* (2013.01); *G06Q 20/204* (2013.01); *G07G 1/0009* (2013.01);
(Continued)

(58) Field of Classification Search
CPC .. G06Q 20/202; G06Q 20/204; G07G 1/0009; G07G 1/0081; G07G 1/009; G07G 1/14
See application file for complete search history.

(56) References Cited

U.S. PATENT DOCUMENTS 8,775,305 B2 7/2014 Pointer
11,018,724 B2 5/2021 Xie
(Continued)

OTHER PUBLICATIONS

CredenSE https://www.nfcw.com/2012/10/31/320843/devicefidelity-launches-new-range-of-nfc-microsd-devices/ (Year: 2012).*
(Continued)

*Primary Examiner* — A. Hunter Wilder
*Assistant Examiner* — Joseph M Mutschler
(74) *Attorney, Agent, or Firm* — KDW Firm PLLC

(57) ABSTRACT

Logic to register a personal point of sale (POS) device. Logic may communicate with the registration processor to establish a secure communication channel. Logic may access a basic input output system to obtain platform information. Logic may transmit the platform information to the registration processor to identify a certification associated with the device. Logic may communicate with a payment instrument via a card reader. Logic may transmit an encrypted message from the card reader to the registration processor to bind the payment instrument to the device. Logic may receive a communication from the device comprising platform information. Logic may perform a security protocol to establish a secure communication channel with the device. Logic may determine an existence of the certification for the device in the database based upon the platform information. And logic may register the platform in response to locating the certification of the platform.

20 Claims, 6 Drawing Sheets

Related U.S. Application Data division of application No. 14/485,306, filed on Sep. 12, 2014, now Pat. No. 10,181,117.

(60) Provisional application No. 61/877,281, filed on Sep. 12, 2013.

(52) U.S. Cl.
CPC ............ *G07G 1/0081* (2013.01); *G07G 1/009* (2013.01); *G07G 1/14* (2013.01)

(56) References Cited

U.S. PATENT DOCUMENTS

| | | | |
|---|---|---|---|
| 2013/0030997 A1* | 1/2013 | Spodak | G06Q 20/3572 705/41 |
| 2013/0139230 A1* | 5/2013 | Koh | G06Q 20/3278 726/5 |
| 2013/0152185 A1* | 6/2013 | Singh | G06Q 20/36 726/9 |
| 2014/0040147 A1* | 2/2014 | Varadarajan | G06Q 20/4016 713/168 |
| 2014/0101047 A1 | 4/2014 | Gardiner | |
| 2014/0324698 A1 | 10/2014 | Dolcino | |
| 2014/0358794 A1 | 12/2014 | Finley | |
| 2015/0348000 A1 | 12/2015 | Khan | |
| 2017/0039557 A1 | 2/2017 | Murphy | |

OTHER PUBLICATIONS

EMV (Year: 2010).*
https://www.gsmarena.com/motorola_atrix_2_mb865-4199.php (Year: 2011).*
https://en.wikipedia.org/wiki/OMAP#OMAP_4 (Year: 2011).*

* cited by examiner

METHODS AND ARRANGEMENTS FOR A PERSONAL POINT OF SALE DEVICE

CROSS-REFERENCE TO RELATED APPLICATIONS

This application is a continuation of, claims the benefit of and priority to previously filed U.S. patent application Ser. No. 16/202,551 filed Nov. 28, 2018, entitled "METHODS AND ARRANGEMENTS FOR A PERSONAL POINT OF SALE DEVICE", which is a division of, claims the benefit of and priority to previously filed U.S. patent application Ser. No. 14/485,306 filed Sep. 12, 2014, issued Jan. 15, 2019 as U.S. Pat. No. 10,181,117, which claims priority to U.S. Patent Application Ser. No. 61/877,281 filed Sep. 12, 2013, which are incorporated herein by reference in their entireties.

TECHNICAL FIELD

The present disclosure relates generally to the field of wireless communications technologies. More particularly, the present disclosure relates to registration of a personal point of sale (POS) device.

BACKGROUND

A significant change in commerce arose in the form of e-commerce, which is the use of personal devices such as personal computers or smartphones to access a web site or app (application software) for the purpose of buying goods and/or services and remotely executing a payment via the web site's or app's payment service. E-commerce is constantly growing in popularity as laptops, smartphones, and tablets become more prevalent. Since e-commerce transactions are remote transactions with respect to the vendor, the purchaser is required to manually enter credit card or payment information either directly into the web site of the vendor, a web site portal of a payment service provider, or into a digital wallet service such as PayPal or MasterPass™. Manually entering credit card information can place the credit card information at different levels of risk depending upon the location of the user and the device utilized to conduct the transaction.

Currently, transactions involving manual entry of credit card information also incur higher processing fees because these transactions are considered card not present (CNP) transactions. The higher processing fees are assessed in the CNP transactions because the cardholder and the payment instrument are not physically present at a certified POS device at the time the payment is made. E-commerce transactions are also riskier transactions since it is easier to commit fraud by stealing account information and using it to make remote payments where the actual card is not needed to complete a CNP transaction.

DETAILED DESCRIPTION OF EMBODIMENTS

Figure 1:
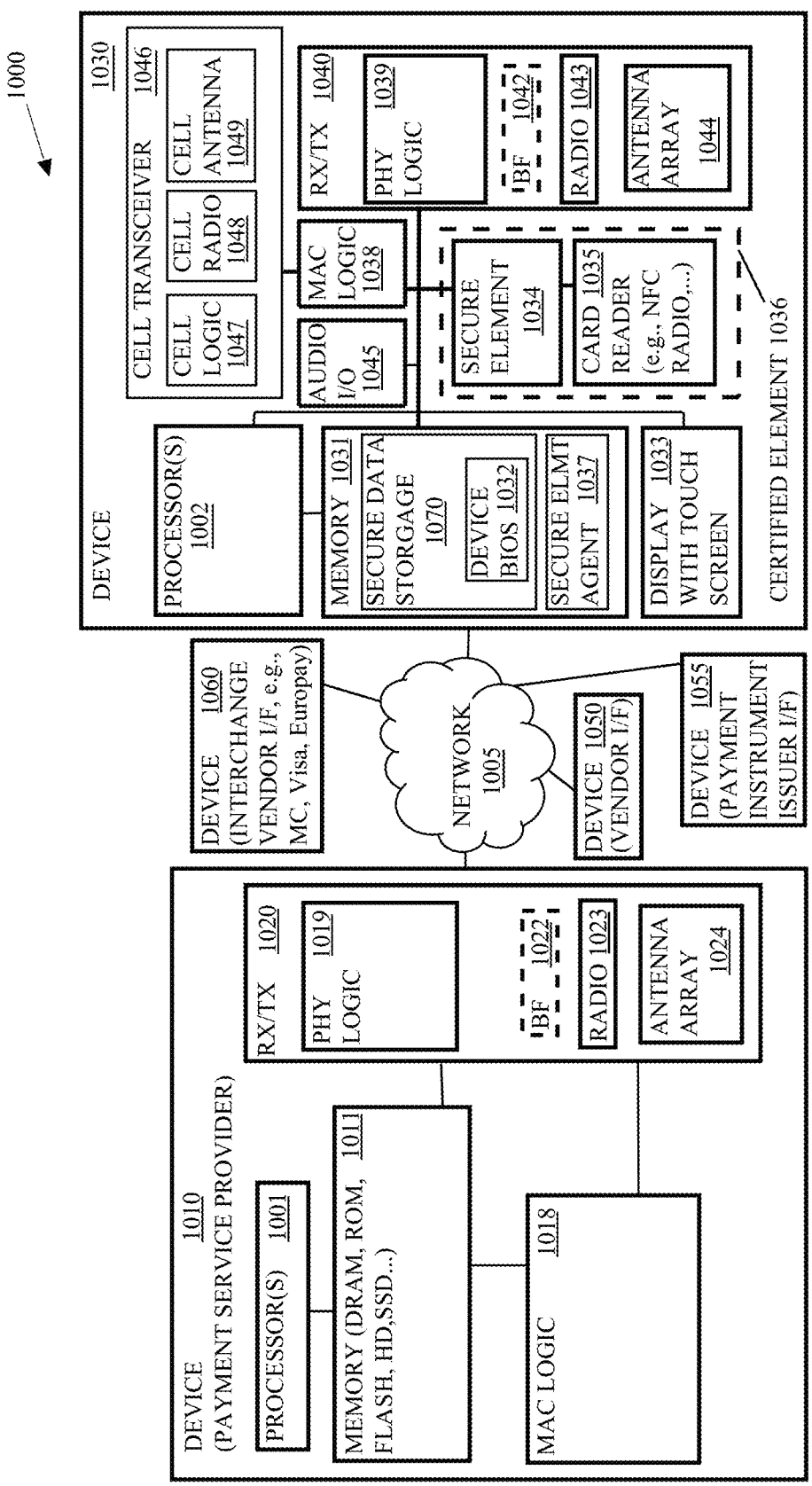
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Embodiments enable PPOS (Personal Point of Sale) payment such as Tap and Pay on personal computers (PCs) using a card reader such as an embedded near field controller (NFC) directly connected to a secure element in, e.g., a controller hub, such as an Intel Management Engine in a Platform Controller Hub (PCH) of Intel's Identity Protection Technology (IPT). In many embodiments, the secure element comprises an independent operating system and is embedded in a chipset.

Once an Original Equipment Manufacturer (OEM) builds a PPOS enabled PC, the OEM should obtain certification for the PC such as a certification to certify compliance with an Europay, Mastercard, Visa (EMV®) Integrated Circuit Card Specifications for Payment Systems version 4.3, Books 1-4, dated November 2011. The certification can verify compatibility with various versions of EMV® compliant credit cards to ensure appropriate operation for both the user and the payment service provider (PSP). For instance, when the user purchases a Tap and Pay enabled PC, the user may enroll the PC into a Digital Wallet service (e.g., MasterPass). If the payment service provider is incapable of determining whether or not the PC is EMV® certified, this may lead to a bad user experience whenever user is tapping their payment card, tainting the product, the payment instrument, and/or causing the user or merchant to consume customer service resources of the PC manufacturer (e.g., Intel Corporation, Apple Inc., or Dell Inc.), the interchange vendor (e.g., Mastercard, Visa, or Europay), the payment instrument issuer (the user's bank that issued the payment instrument), and/or the payment service provider (e.g., Payment Tech, Flagship Merchant Services, or North American Bancard).

Embodiments may integrate a Payment Card Industry (PCI) certified POS terminal into a consumer device itself, be it a phone, a laptop, a desktop, a tablet, a wearable device, etc., such that the presence of a cardholder and card are required to complete an online transaction in the same way they are required at a retail POS (i.e., the actual card is used to authorize and complete the transactions). Some embodiments use a card reader such as a magnetic reader, contacts for a contacted connection with a payment instrument, an optical reader, and/or the like. For instance, in some embodiments, the card reader comprises a magnetic strip reader. In some embodiments, the card reader comprises contacts such as electrical signal contacts to provide for contacted communication with the payment instrument via electrical signals. Some embodiments provide support for EMV® (Europay, MasterCard and Visa) so that an EMV® based payment can be conducted for online transactions. And some embodiments employ NFC (Near Field Communication) to provide a contactless solution.

NFC (Near Field Communication) is gaining wide acceptance within mobile devices and, as a result, NFC radios are being integrated with more and more consumer devices, such as, but not limited to smartphones, tablets, and Ultrabooks™. NFC technology is very flexible and has the capability of being used for countless purposes. Many of the contactless use cases are for convenience (just tap to have something useful or interesting happen) and do not require a high level of security. However, many usage cases do require a high level of security, especially when there is value associated with the information that is made available over the NFC interface. For example, contactless credit cards, contactless identity cards, and contactless access control cards (physical and logical) may contain information that can be fraudulently exploited by a malicious third party.

One way to solve this problem is to have specialized, highly secure, NFC terminal equipment that guarantees that the information is safely processed (and not leaked) when accessed from an NFC tag, contactless card, or NFC device (e.g. smartphone). As consumer devices are expanding their capabilities year over year, there is now a potential to leverage the native NFC capabilities of NFC devices to replace or compliment retail POS terminals.

Various embodiments may be designed to address different technical problems associated with online purchases from online vendors. For instance, some embodiments may be designed to address one or more technical problems such as the inability of consumer devices to verify certification during registration, inability of consumer devices to verify certification of a Radio Frequency (RF) element of the contactless NFC during registration, inability of payment service providers to verify certification of a consumer device during registration, inability of payment service providers to verify certification of a Radio Frequency (RF) element of the contactless NFC of a consumer device during registration, and the like.

Different technical problems such as those discussed above may be addressed by one or more different embodiments. For instance, some embodiments that address inability of consumer devices or payment service providers to verify certification during registration may do so by one or more different technical means such as communicating with a registration processor to initiate registration of the platform as a personal Point of Sale (POS) device, communicating with a registration processor to establish a secure communication channel, interacting with secure data storage such as a system management basic input output system (SMBIOS) to determine platform information of the consumer device, transmitting the platform information to the registration processor to identify the platform as a certified personal POS device, encrypting communications to create encrypted communications to protect the communications from tampering by the applications processor of a platform, encrypting communications to create an encrypted channel or tunnel for the communications between a secure element of a platform and the registration processor to verify the presence of a card of a cardholder, activating a near field communication radio to interact with an EMV® card, communicating a message from the registration processor to a user to prompt the user to process the payment instrument with the card reader, binding the secure element of a platform to the registration processor, determining an existence of the certification for the platform as a personal point of sale (POS) device in the database based upon the platform information, binding the platform to the certification to register the platform, binding a payment instrument with a platform by the registration processor, and the like.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf) and other related wireless standards.

Several embodiments comprise mobile devices or stations (STAs) such as netbooks, mobile devices (Laptop, Smart Phone, Tablet, and the like), as well as televisions, monitors, appliances, and the like.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and one or more radios to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices such as the communication devices 1030, 1050, 1055, and 1060 via the network 1005. The communications device 1010 may comprise a server of a payment service provider. The communications device 1030 may comprise processing devices or other devices and a card reader 1035 such as a contactless personal Point of Sale (POS) that is Payment Card Industry (PCI) certified. In many embodiments, the communication devices 1030, 1050, 1055, and 1060 may comprise devices such as sensors, stations, appliances, computers, laptops, netbooks, cellular phones, smart phones, PDAs (Personal Digital Assistants), appliances, or other wireless-capable devices.

In the present embodiment, the communications device 1050 may comprise a web server executing a web site of an online vendor or merchant that can be reached by the communications device 1030 online via the network 1005 (e.g., the Internet). The communications device 1055 may be a server interface (I/F) of a payment instrument issuer such as the bank that issues a credit card or EMV® (Europay, MasterCard and Visa) card. And communications devices 1060 may be a server I/F of an interchange vendor such Europay, Mastercard or Visa. Thus, communications devices may be mobile or fixed.

Note that vendors, as discussed herein, may generally sell any raw materials, goods, or services to a customer such as a consumer or user. The terms customer, consumer, and user may refer to a person, processing device, a business entity, or other entity that resides anywhere in the supply chain from a distributor to an end-consumer. Vendor may or may not also refer to a manufacturer and/or distributor. The term merchant, as used herein, may typically refer to a seller of goods. And the phrases online vendor or online merchant may refer a presence of the vendor or merchant as a web site on a network such as the Internet, LAN, WAN, MAN, or other network that is accessible by multiple entities and/or persons.

A user of the communications device 1030 may use the touch screen on a display 1033 of the communications device 1030 to execute a web browser or app to register the communications device 1030 as a personal point of service (POS) with a registration processor. In other embodiments, the user may use a keyboard or voice control to register the communications device 1030.

The registration processor may be a server that is either part of or an agent for an interchange vendor for the purposes of registration of a personal POS and, in some embodiments, payment instruments associated with the personal POS. In several embodiments, for instance, the user may register a personal POS directly with the interchange vendor via the communications device 1060. In further embodiments, the user may register the personal POS indirectly with the interchange vendor such as via the payment service provider or other third party service provider. In the former situation, the interchange vendor and the communications device 1060 may be referred to as the registration processor. In the latter situation, the registration processor includes the payment service provider and the communications device 1010 or other third party server and the interchange vendor if the interchange vendor maintains a database of registered personal POS devices or distributes registration information to one or more payment service providers.

The user may also optionally associate one or more payment instruments such as credit cards with the personal POS to bind these payment instruments with the personal POS. In several embodiments, for instance, the personal POS may be registered with the registration processor, such as the communications device 1060, prior to use as a POS. In such embodiments, any payment instruments that the user intends to use with the personal POS may be associated with the personal POS by the registration processor prior to use of those payment instruments with the personal POS, i.e., prior to completing a transaction with the payment instruments via the personal POS. Some embodiments require registration of the personal POS to check the certification of the personal POS. And several embodiments require payment instruments to be associated with the personal POS by the registration processor prior to approving a transaction with the payment instruments for additional security.

Figure 1A:
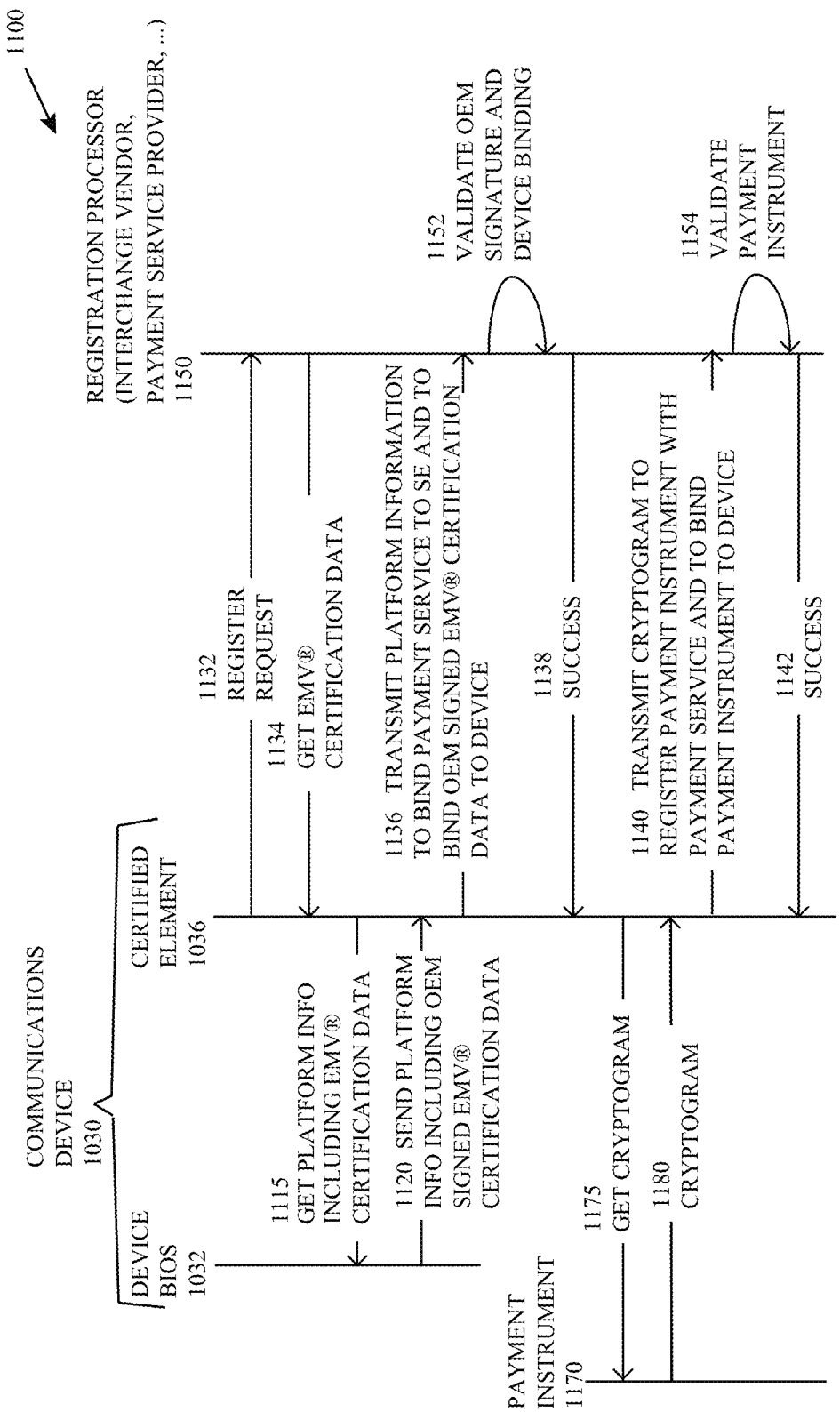
FIG. 1A depicts an embodiment of communication flow to register a device as a certified personal point of sale (POS) device and an embodiment of communication flow to register a payment instrument and bind the payment instrument to a personal POS device.

Referring also to FIG. 1A, there is shown an embodiment of a communication flow 1100 to register the communications device 1030 as a certified personal POS device and to register a payment instrument and bind the payment instrument to a personal POS device. In many embodiments, the user may initiate registration of the communications device 1030 by transmitting a register request 1132 to the registration processor 1150 either through direct communication with the communications device 1060 or indirect communication with the interchange vendor such as via the communications device 1010. Registration with the registration processor 1150 may facilitate communication of the registration to multiple payment service providers such as the communications device 1010.

In the present embodiment, the user of the communications device 1030 may execute a web browser or app to initiate registration of the communications device 1030. The user may initiate registration of the communications device 1030 as a personal POS by initiating communications with the registration processor 1150. More specifically, the user may provide an instruction to the communications device 1030 to register with the registration processor 1150. The processors 1002 may respond by requesting execution of a registration procedure by the certified element 1036 via a secure element agent 1037 and the certified element 1036 may respond by issuing the register request 1132. The secure element agent 1037 may transmit the register request 1132 to the registration processor 1150 via the network 1005. In many embodiments, the user may select the transmission means for communication with the registration processor 1150. In other embodiments, the secure element 1034 may select the transmission means. For instance, the user or secure element 1034 may choose to communicate with the registration processor 1150 via a wired area network such as an Ethernet, via a wireless area network such as an IEEE 802 wireless network, or a cellular network.

After receiving the register request 1132, the registration processor 1150 may respond with a request for EMV® certification data 1134. In many embodiments, the registration processor 1150 may enroll the communications device 1030 if the registration processor 1150 is certified. For instance, in several embodiments, the registration processor 1150 may only bind devices that are EMV® certified. In some embodiments, the registration processor 1150 may only bind devices in which the EMV® certification certifies both digital operation and analog operation of the secure element 1034 and the card reader 1035. In several of such embodiments, the analog certification may comprise certification of one or more of a near field communication radio and antenna, a magnetic medium reader, an optical medium reader, and contacts for a contacted connection of the card reader 1035 to communicate with payment instruments such as a payment instrument 1170.

The certified element 1036 of the communications device 1030 may receive the request for the EMV® certification data 1134 from the registration processor 1150 via a secure element agent 1037. In many embodiments, the certified element 1036 may respond to the request for the EMV® certification data 1134 by accessing memory 1031 to retrieve platform information. In several embodiments, the platform information may reside in secure data storage 1070 of the memory 1031 to limit access to the platform information by, e.g., authenticating accesses to the platform information or otherwise restricting access to the platform information. And, in some embodiments, the platform information may reside in the device basic input output system (BIOS) 1032 in the memory 1031. In the present embodiment, the certified element 1036 may respond to the request for the EMV® certification data 1134 by accessing the device BIOS 1032 to retrieve the platform information from the device BIOS 1032 as a part of registration protocol exchange. The device BIOS 1032 may comprise the system management BIOS (SMBIOS) and the platform information may comprise data associated with the communications device 1030 such as the manufacturer name for the platform, a platform identification, a platform model, a platform serial number, a manufacture name for the secure element, a serial number for the secure element, a firmware version for the secure element, a manufacturer name for the card reader, a serial number for the card reader, a firmware version for the card reader, a stock keeping unit (SKU) number, a firmware version of security software, and/or similar information about the communications device 1030.

In many embodiments, the platform information comprises an encrypted packet that is encrypted, or signed, by the OEM. The certified element 1036 may retrieve the encrypted packet from the secure data storage 1070 such as the device BIOS 1032 and transmit the encrypted packet to the registration processor 1150. In such embodiments, the registration processor 1150 may comprise means to decrypt the packet based upon communication with the OEM and comprise a database to verify that the communications device 1030 is certified. In several embodiments, the platform information identifies the specific model of the communications device 1030 to facilitate verification by the registration processor 1150 that both the secure element 1034 and the card reader 1035 are certified. For example, if the card reader 1035 comprises a contactless NFC radio for Tap and Pay processing of a payment instrument, the specific model of the platform may identify a particular radio frequency (RF) antenna so that the registration processor 1150 may verify that the RF antenna in the device is certified to operate with various versions and manufactures of payment instruments.

In several embodiments, the certified element 1036 may interact with the registration processor 1150 by means of a security protocol. For instance, in some embodiments, during or after the registration procedure, the certified element 1036 may initiate secure transmissions. The security protocol may take any form such as private and public key pairs, passwords, and/or other data to encrypt communications between the certified element 1036 and the registration processor 1150. In many embodiments, a secure channel is established between the certified element 1036 and the registration processor 1150 to prevent potential security breaches within unsecure portions of the communications device 1030. The secure element agent 1037 may facilitate the transmission of such communications for the certified element 1036. In several embodiments, the security protocol may be established by firmware and hardware of the secure element 1034.

In some embodiments, the security protocol may involve, for example, hardware-based generation of a key by the secure element 1034 to transmit to the registration processor 1150 to create a secure association between the secure element 1034 and the registration processor 1150. Thereafter, the communications device 1030 and the registration processor 1150 may communicate via a secure communications channel based upon the key. The security protocol may be initiated during registration or after registration of the communications device 1030. In many embodiments, the secure channel is established prior to provision of platform information from the device BIOS 1032 to the registration processor 1150.

In the present embodiment, after the certified element 1036 of the communications device 1030 may retrieve platform information 1120 from secure data storage 1070 such as the device BIOS 1032 in response to the request for the EMV® certification data 1134, the certified element 1036 may transmit the platform information 1136 to the registration processor 1150 to bind the registration to the certified element 1036 and bind the certification for the communications device 1030 to the certified element 1036.

Upon receipt of the platform information, the registration processor 1150 may verify the platform information. In several embodiments, verification of the platform information may involve decryption of the platform information by the registration processor 1150 with authentication information exchanged with the OEM of the communications device 1030. In some embodiments, the OEM may provide the registration processor 1150 such as the interchange vendor, or an agent thereof, with a decryption key and/or a decryption protocol to decrypt platform information that is stored in the device BIOS 1032 of communications device 1030. In other embodiments, the interchange vendor or registration processor 1150 may provide the OEM with an encryption key and/or an encryption protocol to encrypt platform information that is stored in the device BIOS 1032 of communications device 1030.

If the registration processor 1150 fails to validate the OEM signature then the registration process fails and may terminate. On the other hand, if the registration processor 1150 validates the OEM signature on the certification data, the process of registration of the certified element 1036 is successful and the registration process may proceed to registration of a payment instrument 1170 with the certified element 1036. In some embodiments, the registration processor 1150 may transmit an indication that the registration of the certified element 1036 is successful 1138.

In many embodiments, if the registration processor 1150 validates the OEM signature on the certification data, the registration processor 1150 may bind the certified element 1036 to the certification. In some embodiments, binding the certified element 1036 to the certification may involve associating, by the registration processor 1150, the certified element 1036 with a certification or an indication of the certification in a database or list of certifications accessible by the registration processor 1150. In some embodiments, binding of the certified element 1036 to the certification is accomplished by approval of the registration of the communications device 1030 by the registration processor 1150. Furthermore, binding of the registration to the certified element 1036 may involve association, by the registration processor 1150, of the platform information received from the communications device 1030 with the certified element 1036 in a database within data storage of or data storage accessible by the registration processor 1150.

In some embodiments, for example, the registration processor 1150 (such as the communications device 1060) may register the communications device 1030 by storing the platform information, a portion of the platform information, or a representation of the platform information in a database along with an association with an EMV® certification for the communications device 1030. The registration processor 1150 may also store keys for encrypting and decrypting communications with the communications device 1030 in the database such as a public key received from the communications device 1030 and a private key generated by the registration processor 1150 so that subsequent communications with the communications device 1030 can be secure communications. For instance, in some embodiments, the registration processor 1150 may store, in the database, platform information such as a serial number or MAC address of the communications device 1030 in the database to identify the communications device 1030; an indicator, reference, or offset for the platform information received from the OEM that also includes the certification for the model or type of platform embodied by the communications device 1030; and keys or other encryption and/or decryption information for implementing secure communications with the communications device 1030.

Once the platform information is validated and the registration processor 1150 registers the communications device 1030, the user may register a payment instrument 1170 with the registration processor 1150 as a valid payment instrument for use with the communications device 1030. In several embodiments, registration of payment instruments with the personal POS is optional. In other embodiments, each payment instrument is required to be registered with the personal POS before the payment instrument will be accepted as a valid payment instrument for use with the personal POS by the interchange vendor.

In many embodiments, the payment instrument 1170 may be registered with the registration processor 1150 by requesting a cryptogram 1175 be read from the payment instrument 1170 by the card reader 1035, receiving the cryptogram 1180 received from the payment instrument by the card reader, and transmitting the cryptogram 1140 to the registration processor 1150. In several embodiments, the registration processor 1150 may await registration of one or more payment instruments after the registration of the communications device 1030 as a personal POS. In such embodiments, the certified element 1036 may request the user connect the payment instrument 1170 with the card reader 1035 to initiate communications between the certified element 1036 and the payment instrument 1170.

In some embodiments, the payment instrument 1170 may be a passive device that is activated by connection with the card reader 1035 or proximity to the card reader 1035. For instance, in a Tap and Pay enabled communications device 1030, the card reader 1035 may comprise an NFC radio that activates the payment instrument 1170 when the payment instrument 1170 is within a certain distance of the card reader 1035 such as a few centimeters. In other embodiments, the payment instrument 1170 may be activated by a physical connection with the card reader 1035 or may be a passive storage device that can be read by the card reader 1035 upon physical connection with the card reader 1035.

In further embodiments, the payment instrument 1170 may be an active device that has a power source and can transmit the cryptogram 1180 to the certified element 1036 via a wireless or physical connection with the card reader 1035. Active payment instruments may include, for instance, smart phones or other processing devices with a payment instrument protocol for interaction with the card reader 1035.

The payment instrument 1170 may comprise, for example, a smartphone and/or a physical credit card. To illustrate, the smartphone may include an embedded payment instrument system with an application that is protected from tampering and/or view such as a secure element (SE) or a trusted platform module (TPM) that includes a processor, code, and memory. In further embodiments, the smartphone may include a state machine in lieu of or in addition to the processor, code, and memory. The physical credit card may include a processor, code, and memory or a state machine. In other embodiments, the smartphone and/or physical credit card may comprise at least one of a magnetic medium, an optical medium, a memory, another type of medium, a processor, or a state machine and an interface to facilitate communication with a card reader 1035.

The cryptogram 1180 may comprise encrypted information. In some embodiments, the cryptogram 1180 may be a random number that meets specific criteria that uniquely identifies the payment instrument 1170. In further embodiments, the cryptogram 1180 may comprise encrypted information that can be decrypted by the registration processor 1150 so, e.g., the communications device 1060 can verify that the payment instrument 1170 is a valid payment instrument.

In response to validating a cryptogram 1180 from the payment instrument 1170, the registration processor 1150 may associate the payment instrument 1170 with the communications device 1030. In several embodiments, the registration processor 1150 may transmit an indication of successful registration 1142 of the payment instrument 1170 with the communications device 1030 and either await a cryptogram from another payment instrument or terminate the registration process.

After the communications device 1030 is registered as a personal POS, subsequent communications between the communications device 1030 and the registration processor 1150 may be initiated and executed via a security protocol. In many embodiments, subsequent communications between the communications device 1030 and the communications device 1010 and/or the communications device 1060 may be initiated and executed via the security protocol. The security protocol may use the keys or other encryption/decryption information that is associated with the communications device 1030 to create a secure channel for communications via the secure element agent 1037 of the communications device 1030.

Once a secure channel is established between the certified element 1036 and the registration processor 1150, the user may register a payment instrument or execute a payment for a transaction. For instance, a user of the communications device 1030 may use the touch screen on a display 1033 of the communications device 1030 to access an online vendor web site on the communications device 1050 to purchase some goods and/or services via the network 1005. After placing one or more items in the cart for the online vendor, the user may choose a function for checking out, or purchasing, the items in the cart.

Figure 1B:
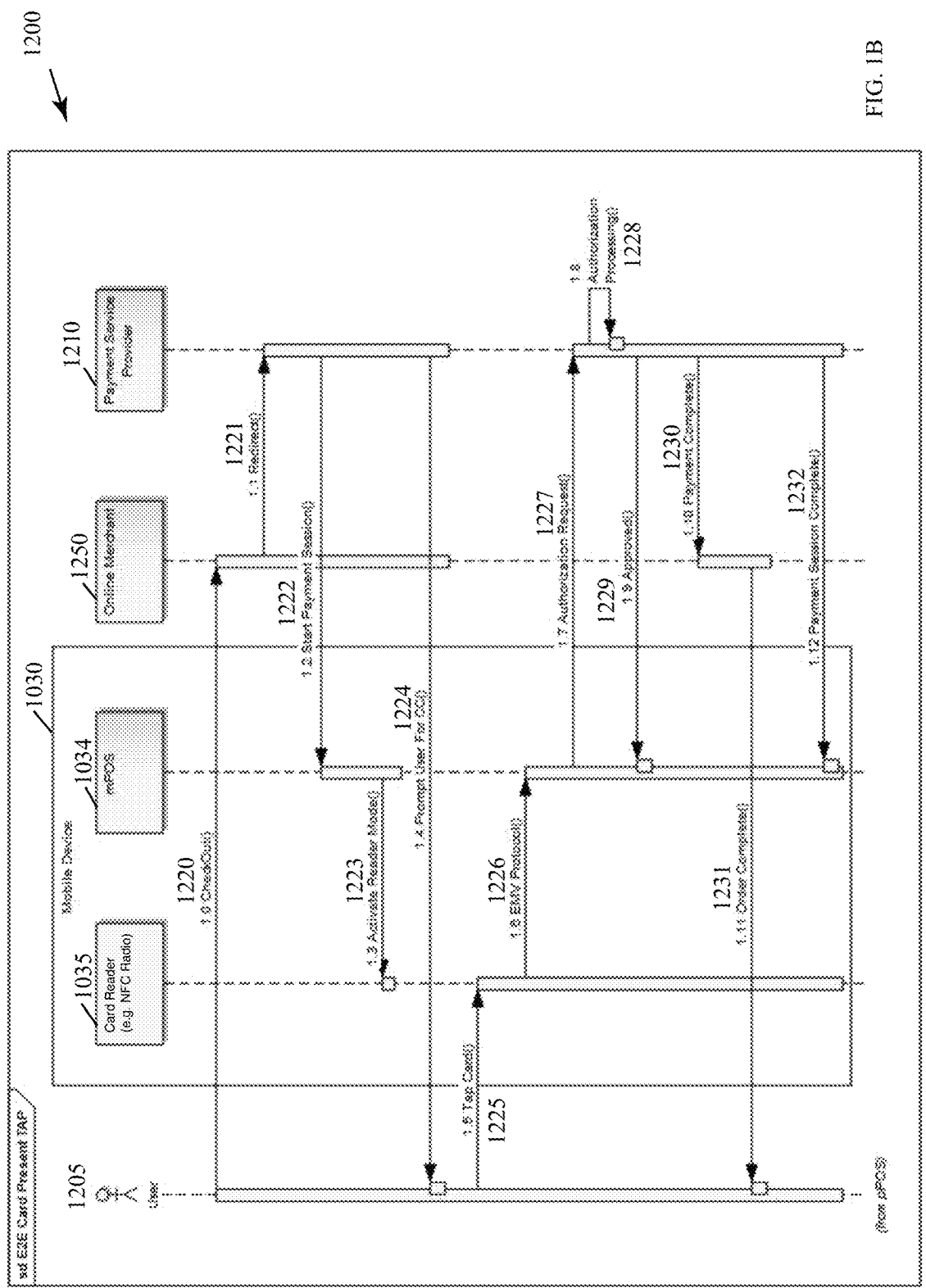
FIG. 1B depicts an embodiment of communication flow to perform a transaction in which a device functions as a certified personal POS device to process a payment to an online vendor.

Referring also to FIG. 1B, there is shown an embodiment of communication flow 1200 to perform an mCommerce transaction with a personal POS such as the communications device 1030. After the user 1205 confirms the intention to purchase the items in the cart and possibly other merchant specific interactions, the secure element 1034 may establish a secure communications channel with the communications device 1060 as a registered personal POS via the payment service provider 1210 (the communications device 1010 in FIG. 1) to process a payment by a user 1205 of the communications device 1030 for the online merchant 1250 (the communications device 1050 in FIG. 1). In many embodiments, the online merchant 1250 may redirect communications from the secure element 1034 to the payment service provider 1210 (represented by the communication device 1010 in FIG. 1). And the payment service provider 1210 may transmit the communications to the communications device 1060 for authorization processing 1228 to validate the registration of the communications device 1030, to validate the payment instrument provided by the user 1205, and to approve and process the payment.

Once the user 1205 confirms the purchase of the items in the cart, the online merchant 1250 redirects 1221 the communications from the communications device 1030 to the payment service provider 1210. In some embodiments, the communications device 1030 may establish communications with the payment service provider 1210 through a secure communications channel based upon the keys and/or other encryption/decryption information provided to the interchange vendor by the communications device 1030 during registration. In some embodiments, the keys and/or other encryption/decryption information are provided to the payment service provider 1210 through a service agreement with the interchange vendor. In other embodiments, the communications from the communications device 1030 are transmitted from the payment service provider 1210 or via the payment service provider 1210 to a backend server of the interchange vendor such as the communications device 1060. In some embodiments, the online merchant 1250 may communicate with the payment service provider 1210 to initiate a transaction for the payment that is associated with the online merchant or the online merchant's account prior to or while redirecting 1221 the communications from the communications device 1030 to the payment service provider 1210.

In some embodiments, redirection 1221 of the communications may involve communications via the same network 1005, e.g., the Internet, as the communications between the communications device 1030 and the online merchant 1250. In other embodiments, the redirection 1221 of the communications may involve the user 1205 connecting with the payment service provider 1210 via a different network or communications channel such as a cellular data network, a telephone line, an Ethernet network, or a wireless network to process the payment with the payment service provider 1210.

In response to redirection 1221 by the online merchant 1250 of communications with the user 1205 during the checkout process, the payment service provider 1210 may start a payment session 1222 with the communications device 1030. In some embodiments, at the start of or during the payment session 1222, the payment service provider 1210 may verify registration of the communications device 1030 as a personal POS.

The direct interaction between the secure element 1034 and the payment service provider 1210 may involve the use of a secure element agent 1037 such as an application executing on the processor(s) 1002 of the communications device 1030. The secure element agent 1037 may be configured to pass encrypted communications from the payment service provider 1210 to the secure element 1034 and from the secure element 1034 to the payment service provider 1210. In many embodiments, the secure element agent 1037 is unable to decrypt the encrypted communications between the payment service provider 1210 and the secure element 1034.

After the payment service provider 1210 starts a payment session 1222, the secure element 1034 may activate 1223 the card reader 1035. In some embodiments, the card reader 1035 may comprise a contactless reader such as an NFC radio, a magnetic reader, and/or an optical reader. In some embodiments, the card reader 1035 may comprise a contacted reader such as one or more electrical contacts, one or more optical contacts, a magnetic reader, and/or an optical reader.

The payment service provider 1210 may transmit a message to the user 1205 via the card reader 1035 to effectively inform or prompt 1224 the user 1205 to couple the payment instrument with the card reader 1035 by placing the payment instrument near enough to or in contact with the communications device 1030 to communicate with the card reader 1035. In many embodiments, the message may be displayed on the display 1033 of the communications device 1030 or sounded via speakers of the audio input-output (I/O) 1045 of the communications device 1030. In some embodiments, the card reader 1035 may require physical contact with the payment instrument to interact with the payment instrument and the mobile device 1030 may prompt 1224 the user 1205 to physically couple the payment instrument with the card reader 1035. In several embodiments, the payment instrument may be powered by the card reader 1035 and, in other embodiments, the payment instrument may include a power source to facilitate communications with the card reader 1035.

In several embodiments, the secure element 1034 and the card reader 1035 may be part of a "tamper-proof" PCI-certified element 1036. In some embodiments, the secure element 1034 and/or the card reader 1035 may be a detachable attachment coupled with the communications device 1030. In some embodiments, the secure element 1034 and/or the card reader 1035 may be a die in the same chip package as the processors 1002, memory 1031, audio I/O 1045, MAC logic 1038, transceiver (RX/TX) 1040, and/or the cell transceiver 1046. Further embodiments may comprise a System on a Chip (SOC) comprising the secure element 1034 and/or the card reader 1035 with the processors 1002, memory 1031, audio I/O 1045, MAC logic 1038, transceiver (RX/TX) 1040, and/or cell transceiver 1046. In one embodiment, the processors 1002, memory 1031, audio I/O 1045, MAC logic 1038, transceiver (RX/TX) 1040, and/or cell transceiver 1046 are on the same die as the secure element 1034 and/or the card reader 1035. And, in another embodiment, the secure element 1034 comprises an embedded system isolated via a hardware isolation scheme from a main operating system for the communications device 1030 but sharing processor cycles or utilizing one or more processors or processor cores of the processor(s) 1002. In several of these embodiments, the secure element 1034 may operate independently from the main operating system of the communications device 1030.

In response to the message, the user 1205 may tap 1225 the payment instrument on the card reader 1035. In other embodiments, the user 1205 may couple 1225 the payment instrument or card with the card reader 1035 via contact or via another contactless protocol to proceed with the payment session 1222. In some embodiments, the mobile device 1030 may comprise a marking or written indication on the mobile device 1030 that indicates the location of the card reader 1035 and/or how to use the card reader 1035. For example, a card reader 1035 may comprise a magnetic and/or optic reader to read or interact with a magnetic medium or optic medium on the payment instrument or may comprise contacts to read or interact with a processor or memory on the payment instrument.

After the card reader 1035 communicates with the payment instrument, the card reader 1035 may transmit data, e.g., via an EMV® protocol 1226, determined from communication with the payment instrument to the secure element 1034. In many embodiments, the data is encrypted to form an encrypted packet such as a cryptogram.

After receipt of the encrypted packet from the card reader 1035, the secure element 1034 may transmit the encrypted packet to the payment service provider 1210 to request authorization for the payment 1227. In many embodiments, the secure element 1034 may transmit the encrypted packet in or along with encrypted communications between the secure element 1034 and the payment service provider 1210 via the secure agent 1037 to verify that the payment card is physically present.

After receipt of the authorization request 1227 with the encrypted packet determined from the payment instrument, the payment service provider 1210 may process the payment. In several embodiments, processing the payment may involve validating, by the payment service provider 1210, the payment instrument; verifying, by the interchange vendor, that the payment instrument is registered as a valid payment instrument for use with the communications device 1030; and verifying approval of the payment by the bank that issued the payment instrument. The payment processing service 1210 or the interchange vendor may verify that the payment instrument is a valid instrument based upon a cryptogram received from the payment instrument.

If the payment instrument is valid and, in some embodiments, if the payment instrument is registered for use with the communications device 1030, the interchange vendor may transmit the payment information to the communications device 1055, the bank that issued the payment instrument, to determine if the communications device 1055 approves the payment. The communications device 1055 may determine approval of the payment to the online merchant 1250 based upon a number of factors related to a contract between the bank and the user 1205.

If the communications device 1055 approves the transaction, the approval may be transmitted to the payment service provider 1210. The payment service provider 1210 may transmit an indication of the approval 1229 to the secure element 1034, an indication of the payment completion 1230 to the online merchant 1250, and terminate the payment session 1232 between the payment service provider 1210 and the secure element 1034. In many embodiments, the issuing bank of the payment instrument such as the communications device 1055 may process the payment to transmit the payment to the online merchant's 1250 account. And, in several embodiments, the online merchant 1250 may transmit an indication to the user 1205 that the payment or order is completed 1231.

Referring again to FIG. 1, the network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise one or more data processing devices such as processor cores, microprocessors, microcontrollers, state machines, and the like. The memory 1011 and 1031 may comprise a storage medium such as dynamic random access memory (DRAM), read only memory (ROM), buffers, registers, cache, flash memory, hard disk drives, solid-state drives, or the like. In many embodiments, the memory 1011 and 1031 may comprise a device BIOS such as device BIOS 1032 and a secure element agent such as secure element agent 1037. In several embodiments, the memory 1011 and 1031 may also comprise applications or other code that a user may generally use. For instance, in some embodiments, the communications device 1030 may comprise a smartphone and the memory 1031 may comprise an operating system and a phone application for placing calls via a cell transceiver 1046. In several embodiments, the communications device 1030 may comprise a processing device such as a desktop or mobile computer and the memory 1031 may comprise utilities and business applications.

The memory 1011 and 1031 may also store frames and/or frame structures such as standard frames and frame structures identified in IEEE 802.11 for wireless communications. Note also that memory 1011 and 1031 may reside anywhere in the system, such as in proximity to or in the MAC sublayer logic 1018 and 1038, the transceivers (RX/TX) 1020 and 1040, and/or the cell transceiver 1046.

Medium access control (MAC) sublayer logic (MAC logic) 1018 and 1038 may comprise logic to implement functionality of the MAC sublayer of the data link layer of the communications devices 1010 and 1030, respectively. The MAC logic 1018 and 1038 may generate frames such as management frames, data frames, and control frames, and may communicate with the PHY logic 1019 and 1039, respectively, to transmit the frames. The PHY logic 1019 and 1039 may generate physical layer protocol data units (PPDUs) based upon the frames. More specifically, frame builders of the MAC logic 1018 and 1038 may generate the frames and data unit builders of the PHY logic 1019 and 1039, respectively, may prepend the frames with preambles to generate PPDUs for transmission via a physical layer device such as the transceivers (RX/TX) 1020 and 1040, respectively.

The communications devices 1010, 1030, 1050, 1055, and 1060 may each comprise a transceiver such as transceivers 1020 and 1040. Each transceiver 1020 and 1040 comprises a radio 1023 and 1043, respectively, comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

The communications devices 1010, 1030, 1050, 1055, and 1060 may communicate with the network 1005 wirelessly via the transceivers 1020 and 1040, physically through network interface cards (not shown), wirelessly through cell transceivers such as the cell transceiver 1046 or by other network means. FIG. 1 may depict a number of different embodiments including a Multiple-Input, Multiple-Output (MIMO) system with, e.g., four spatial streams, and may depict degenerate systems in which one or more of the communications devices 1010, 1030, 1050, 1055, and 1060 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

In some embodiments, the communications device 1010 optionally comprises a Beam Former (BF) 1022, as indicated by the dashed lines. The BF 1022 provides spatial filtering and is a signal processing technique used with antenna array 1024 for directional signal transmission or reception. This is achieved by combining elements in a phased antenna array 1024 in such a way that signals at particular angles experience constructive interference while others experience destructive interference. Beamforming can be used at both the transmitting and receiving ends in order to achieve spatial selectivity. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, 1055, and 1060. Similarly, the communications device 1030 comprises a transceiver 1040 to receive and transmit signals from and to the communications device 1010. The transceiver 1040 may comprise an antenna array 1044 and, optionally, a BF 1042.

In the present embodiment, the communications device 1030 may also comprise cellular phone communications capabilities. The MAC logic 1038 may prepare audio and data packets for transmission through the cell transceiver 1046 based upon the technologies associated with the communications device 1030. For instance, the cell transceiver 1046 may comprise cell logic 1047, a cell radio 1048, and a cell antenna 1049 to implement 3G or 4G wireless standards that may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth.

The cell logic 1047 may encode and modulate packets for transmission and demodulate and decode packets for reception. The cell radio 1048 may amplify and convert the signals into radio signals for transmission via the cell antenna 1049. And the cell radio 1048 may receive, amplify and convert the signals from radio signals for reception via the cell antenna 1049. In some embodiments, the communications device 1030 may also comprise a subscriber identification module (SIM). The SIM may be an integrated circuit that securely stores the international mobile subscriber identity (IMSI) and the related key used to identify and authenticate subscribers on mobile telephony devices (such as mobile phones and computers).

In some embodiments, the SIM may contain data that can be used to verify the presence of a cardholder for a payment transaction with an online merchant 1250. In several embodiments, the cellular transceiver 1046 may be used for communications between the payment service provider 1210 and the secure element 1034.

Figure 2:
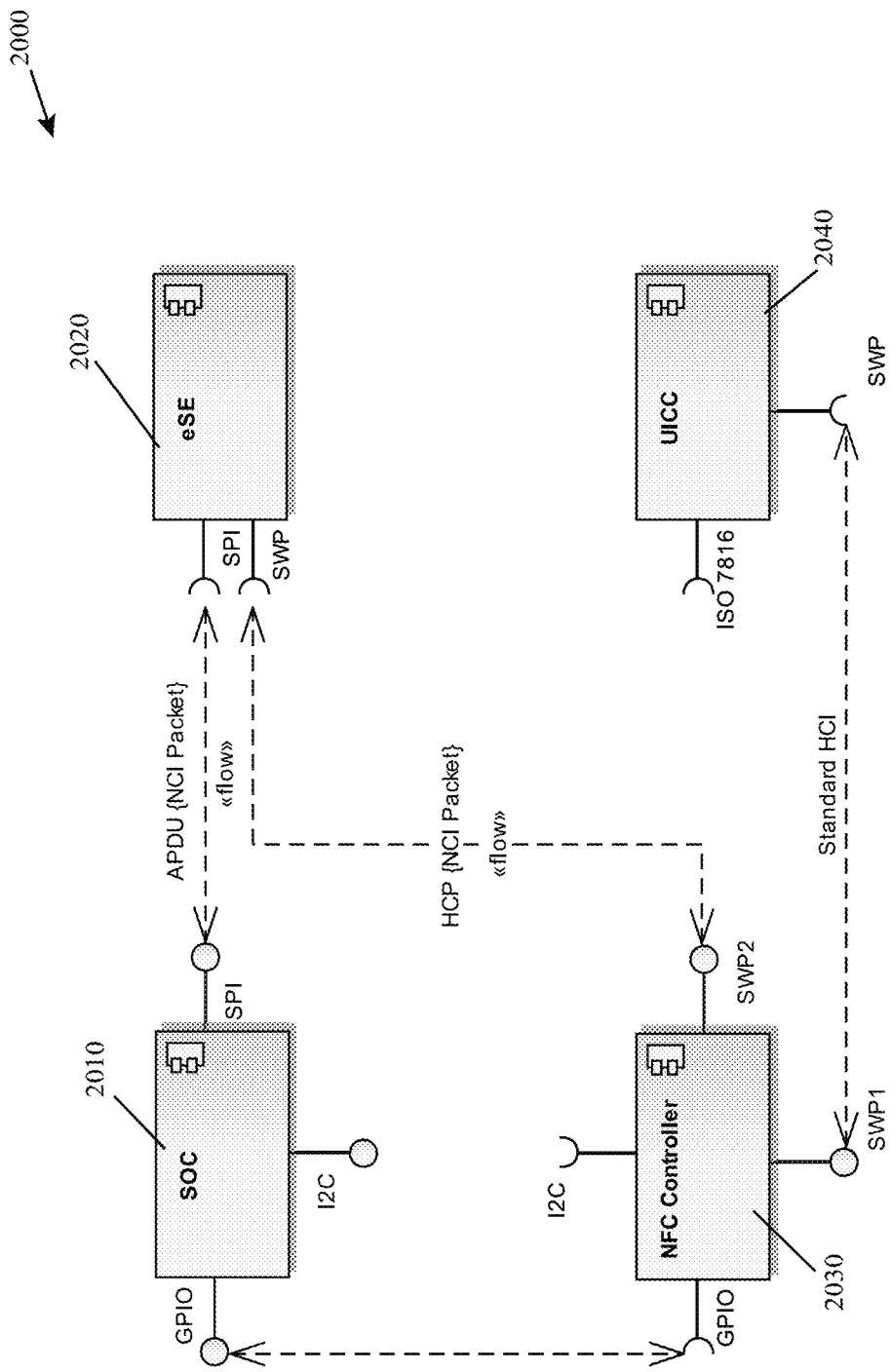
FIG. 2 depicts an embodiment of a device that is a personal POS device.

FIG. 2 depicts an embodiment of a mobile device 2000 as a personal POS. The mobile device 2000 may register with an interchange vendor to bind the personal POS with a certification for the personal POS, register one or more payment instruments to bind the payment instruments with the personal POS, and process payments for transactions with the payment instrument via the mobile device 2000. The mobile device 2000 may be a certified personal POS that the cardholder can use to process a payment to a merchant without manually entering payment information by communicating with a payment instrument via a Near Field Communications (NFC) controller 2030.

In the present embodiment, the mobile device 2000 may comprise a system-on-chip (SOC) processor 2010, an embedded secure element (eSE) 2020, the NFC controller 2030, and a subscriber identification module (SIM) 2040. The mobile device 2000 may comprise the SOC processor 2010 as a main processing unit for the mobile device 2000. The SOC processor 2010 may represent one or more processors that are configured to perform general and specific operations of the phone. In many embodiments, a main operating system may execute on the SOC processor 2010 to execute applications to interface with a user via, e.g., a graphical user interface. In some embodiments, the mobile device 2000 may comprise a cellular phone, smartphone, laptop, notebook, MP3 player, wearable processing device, or other mobile processing device. In other embodiments, the mobile device 2000 may be a stationary processing device such as a desktop computer, workstation, and/or the like.

In many embodiments, the SOC processor 2010 may comprise a network controller to connect to a network such as the Internet or another network via a wired and/or wireless connection. In some embodiments, the SOC processor 2010 may also comprise memory and an input-output controller to implement the functionality of the mobile device 2000.

The mobile device 2000 may comprise a tamper-proof component eSE 2020 at the center of the architecture. In this tamper-proof centric architecture, the NFC controller 2030 is physically (as opposed to virtually) isolated from the SOC processor 2010 (or main processor unit) by removing or not implementing the data path between the NFC controller 2030 and the SOC processor 2010 indicated by the Inter-Integrated Circuit or I-squared-C (I2C) bus connections of the SOC processor 2010 and the NFC controller 2030. Instead, the SOC processor 2010 is connected to the eSE 2020 via, e.g., a serial peripheral interface (SPI) connection and the eSE 2020 is connected to the NFC controller 2030. In this way, the highly sensitive data received over the NFC controller 2030 interface is sent directly and exclusively to the eSE 2020, where it can be securely processed without exposing such sensitive data directly to the SOC Processor 2010 and the software (e.g. Android, Windows, etc.) running on the SOC processor 2010, which may be compromised and/or malicious.

Note that the general purpose input-output (GPIO) may interconnect the SOC processor 2010 with the NFC controller 2030 without compromising the security because the GPIO interface on the NFC controller 2030 is not capable of a sufficiently complex communication with the SOC processor 2010 to compromise security.

The eSE 2020 may be a smart card chip that stores information, manages security, and provides a firewall between NFC applications and other elements in the mobile device 2000. In several embodiments, the eSE 2020 may also be a tamper resistant Smart Card chip that facilitates the secure storage and transaction of payment and other sensitive credentials. Secure elements may be used in multi-application environment and can be available in multiple form factors like plastic smart cards, UICC (SIM)s, eSEs, micro secure digital (microSD) cards, etc.

In several embodiments, the eSE 2020 may comprise one or more of a secure microcontroller, a processing unit, an operating system, memory, immutable (ROM), mutable electrical erasable programmable read only memory (EE-PROM), volatile random access memory (RAM), crypto engine, sensor, timer, communication ports, and/or the like.

In the present embodiment, the eSE 2020 may be formally evaluated and certified by EMV®co and/or common criteria standard procedures and suitable for highly secure use cases within the payment card industry (PCI) (i.e., to make and receive payment), mobile subscription management, identity management, strong authentication, etc.

It is to be noted that while at present embodiment comprises the eSE 2020, embodiments may comprise any tamperproof architecture to protect data from access by malicious or compromised software. For example, tamper-proof protection such as the eSE 2020 may be integrated into SOC processor 2020 thereby displacing the discrete eSE 2020 in favor of an integrated solution.

In the present embodiment, the eSE 2020 may comprise logic such as hardware and/or code to register with an interchange vendor, register one or more payment instruments with the interchange vendor, and perform a point of sale (POS) transaction with an online vendor by implementing PCI certified POS functionality. In many of these embodiments, the eSE 2020 may couple with the NFC controller 2030 to communicate with a web site of the online vendor to process a payment to the online vendor as a certified POS device rather than transmitting payment instrument information to the online vendor to use the online vendor's POS device.

Once the user of the mobile device 2000 indicates that the user intends to register with an interchange vendor, the eSE 2020 may initiate communications with the interchange vendor, transmit or exchange keys with the interchange vendor, access memory such as device BIOS to obtain platform information signed by the OEM, and transmit the OEM signed platform information to the interchange vendor.

In several embodiments, the eSE 2020 may communicate with a payment instrument after registration of the mobile device 2000 with the interchange vendor to register one or more payment instruments as valid payments instruments to process payments with the mobile device 2000. In many embodiments, the eSE 2020 may interact with the NFC controller 2030 to obtain a packet from a payment instrument and transmit the packet to the interchange vendor to bind the payment instrument to the mobile device 2000 for the purposes of processing payments with payment instrument via the mobile device 2000. The eSE 2020 may communicate the packet to the interchange vendor via a secure channel that can be decrypted via the key provided to the interchange vendor by the eSE 2020.

The SIM 2040 may store network-specific information used to authenticate and identify subscribers on the cellular network. The network-specific information may comprise the ICCID, IMSI, authentication key (Ki), local area identity (LAI) and operator-specific emergency number. The SIM 2040 may also store other carrier-specific data such as the SMSC (short message service center) number, service provider name (SPN), service dialing numbers (SDN), advice-of-charge parameters and value added service (VAS) applications.

The SIM 2040 may comprise a SIM card with a unique integrated circuit card (UICC) identifier (ICCID). ICCIDs may be stored in the SIM cards and also engraved or printed on the SIM card body during a process called personalization. In many embodiments, the ICCID number may be up to 22 digits long, including a single check digit calculated using a Luhn algorithm. In some embodiments, the ICCID length may be 10 octets (20 digits) with an operator-specific structure. In other embodiments, the SIM 2040 may comprise a different number or code with the same of different length.

Figure 3:
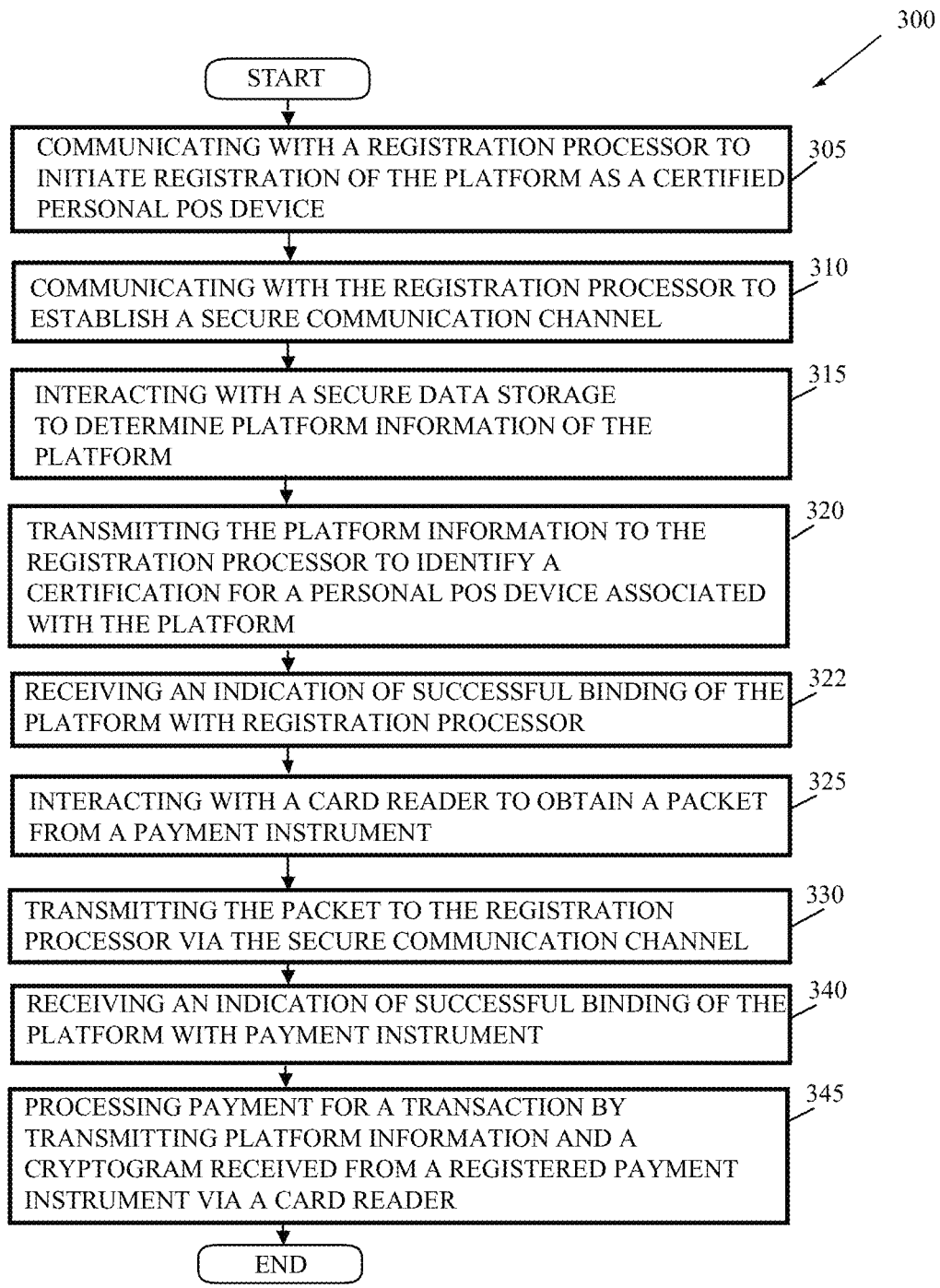
FIG. 3 depicts an embodiment of a flowchart for a personal processing device to register as a certified personal POS device.

FIG. 3 illustrates an embodiment of a flowchart 300 for a personal processing device such as the communications device 1030 in FIG. 1 to register as a certified personal POS device. The flowchart 300 begins with communicating with a registration processor such as the registration processor 1150 in FIG. 1A to initiate registration of the platform as a certified personal POS device (element 305). In many embodiments, a cardholder may shop on online vendors' web sites with the personal processing device. However, the process of entering payment information such as credit card numbers, expiration dates, personal identification numbers, and the like exposes the user to risk. So the user may initiate registration of a platform that has an EMV® certified element such as the certified element 1036 in FIG. 1. In several embodiments, initiation of registration of a platform such as a laptop, smart phone, or other device may involve initiating a registration procedure such as contacting the registration processor via a network. In some embodiments, contacting the registration processor may comprise contacting an interchange vendor such as Mastercard or Visa through a web server interface either directly by accessing the web server's web site or indirectly by accessing a third party web site such as a web site for a payment service provider. The third party web site might collect platform information and relay the platform information to a server for the interchange vendor or may redirect the communications from the platform to the server for the interchange vendor.

After initiating registration of the platform, the certified element may communicate with the registration processor to establish a secure communication channel (element 310). In some embodiments, once the certified element initiates the registration procedure, the certified element and the registration processor may execute a security protocol. In many embodiments, the security protocol may involve exchanging keys to establish a secure channel. For instance, in some embodiments public keys may be exchanged to facilitate decryption of communications encrypted with private keys. In such embodiments, the communications device transmitting the communication may encrypt the communication with a private key and the public key provided to the other device may provide a means by which the other device can decrypt the message. In further embodiments, a secure channel may be implemented with another security protocol. And, in other embodiments, the communications between the certified element and the registration device may not be encrypted or the security protocol may not be implemented until after registration of the certified element.

After the registration procedure is initiated, the certified element may interact with its device's BIOS to acquire platform information about the device (element 315) and may transmit the platform information to the registration processor to identify a certification for a personal POS device associated with the device (element 320). In some embodiments, the platform information may be in the form of an encrypted packet from the OEM. In other embodiments, the certified element may gather unencrypted platform information. In several embodiments, the platform information may comprise one or more of the MAC address of the device, the serial number of the device, the model number of the device, the SKU number of the device, the build number of the device, the build date of the device, the firmware version of the security protocol, the firmware version of the registration procedure, the model identifier, the processor speed, the processor version, the processor serial number, the boot ROM version, the system management controller version, a serial number of another part of the device, a universal unique identifier (UUID) of the device, or a part thereof, and the like.

Based upon the platform information, the certified element may receive a response indicating that the registration processor successfully identified a certification for the device as a personal POS, and successfully registered the device, binding the device to the certification (element 322). On the other hand, if the registration processor fails to identify a certification for the device, the certified element may receive an indication that the registration was not successful such as an error code or message to display to the cardholder stating that the "PC is not EMV® Certified".

After successfully registering the certified element and exchanging security information to establish a secure communications channel, if implemented, the certified element may interact with a card reader to obtain a packet from a payment instrument (element 325). For instance, the certified element may display a message, voice a message, or otherwise request that the cardholder connect a payment instrument with the card reader so that the certified element may proceed to register the payment instrument with the registration processor and associate the payment instrument with the personal POS device for subsequent use in a payment processing transaction. The cardholder may respond by connecting or tapping the card reader with the payment instrument to obtain the packet from the payment instrument.

After obtaining the packet from the payment instrument, the certified element may transmit the packet to the registration processor via a secure communications channel between the certified element and the registration processor (element 330). If the payment instrument is a valid instrument, the registration processor may respond with an indication of successful binding of the registration of the device with the payment instrument (element 340).

After registering the certified element and binding the payment instrument with the registration of the certified element, the cardholder may use the personal POS to communicate with a payment service provider to process the payment. In many embodiments, the a secure element of the certified element may interact with the card reader of the certified element to obtain a packet (or cryptogram) from the payment instrument and transmit the packet along with platform information to the payment service provider to process a payment (element 345). In many embodiments, the payment service provider may transmit a message or an indication of a message to the secure element of the personal POS device to prompt the cardholder to couple the payment instrument or card with the personal POS device to process the payment with the payment instrument and the card reader.

In some embodiments, after the payment service provider transmits the message or indication to the secure element, the secure element may respond by activating a near field communication radio to interact with an EMV® (Europay, MasterCard, and Visa) card to process the payment with the personal processing device. The secure element may also respond by prompting the cardholder to couple the EMV® card with the personal processing device to process the payment. The secure element may then interact with EMV® card of the cardholder via the card reader to obtain a packet to process the payment. In other embodiments, a different type of card reader may be activated to read the payment instrument of the user. And, in several embodiments, the EMV® card may provide an encrypted packet or cryptogram to the secure element via the card reader to process the payment.

The secure element may encrypt communications to transmit an authorization request to the payment service provider to process the payment. The secure element may transmit the authorization request with encrypted communications via a secure element agent of the certified POS device and the authorization request may comprise the encrypted packet or cryptogram to verify that the card is present for the transaction.

After transmitting the authorization request to the payment service provider, the secure element may receive an approval of the authorization request for the payment. And, thereafter, the secure element may receive a completed payment session communication from the payment service provider. The completed payment session communication may terminate the payment session and terminate the direct communications between the personal processing device and the payment service provider.

Figure 4:
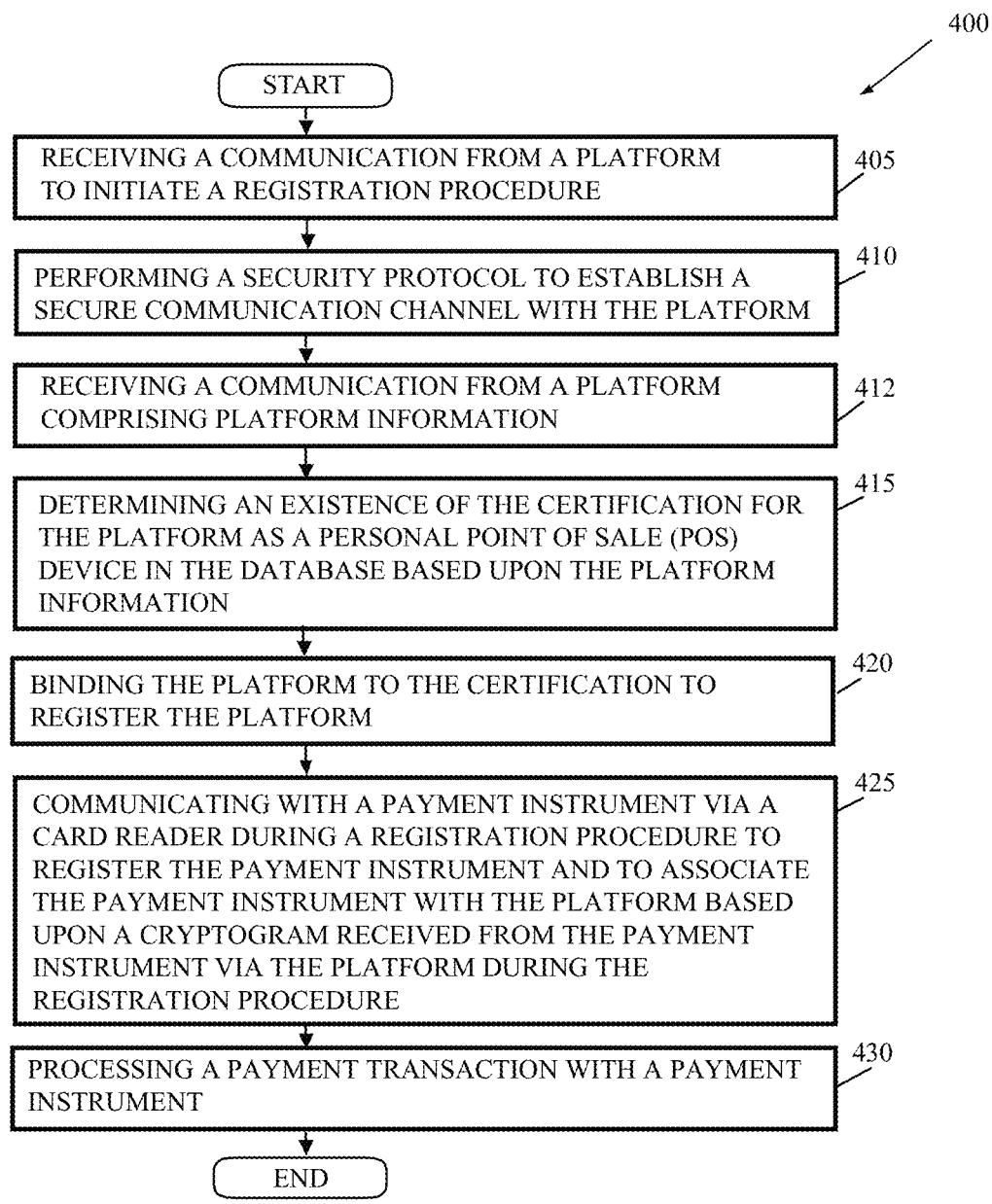
FIG. 4 depicts another embodiment of a flowchart for a registration processor to register a personal processing device as a personal POS device.

FIG. 4 illustrates an embodiment of a flowchart 400 for a registration processor such as the registration processor discussed in conjunction with FIGS. 1 and 1A to register a personal processing device as a certified personal POS device. The flowchart 400 begins with receiving a communication from a platform to initiate a registration procedure (element 405). In many embodiments, a cardholder may initiate a registration procedure to register a personal POS platform for performing payment transactions. The cardholder may register the personal POS platform as well as one or more payment instruments so that the cardholder may conveniently and safely use the cardholder's own personal POS platform without concern about skimmers and other fraud in the transactions with a vendor.

After receiving a communication from a platform to initiate registration procedure, the registration processor may perform a security protocol to establish a secure communication channel with the personal POS platform (element 410). In many embodiments, the security protocol may involve the exchange of information such as encryption/decryption protocols or keys to provide a basis for encrypting communications between the platform and the registration processor. In some embodiments, the particular security protocol may depend upon the security protocol versions installed in the personal POS platform and the registration processor. In several embodiments, the security protocol may store the encryption/decryption protocols or keys in memory at least temporarily until registration of the personal POS platform is successful. If the registration is successful, the security protocol may store the encryption/decryption protocols or keys in memory for subsequent communications with the personal POS platform such as subsequent payment processing transactions.

After establishing a secure communication channel, the registration processor may receive a communication from a platform including platform information such as certification data (element 412). In many embodiments, the registration processor may receive platform information that includes a manufacturer associated with the platform, a manufacturer associated with the certified element, a manufacturer associated with the secure element, a manufacturer associated with one or more card readers, a model of the platform, one or more serial numbers associated with the platform, one or more SKUs associated with the platform, and/or the like. The registration processor may then search a database with one or more of portions of data from the platform information such as a manufacturer and a model number to determine if that manufacturer and model number are associated with a certification such as an EMV® certification or other PCI certification. If the registration processor locates a certification in the database that matches the platform information (element 415), the registration processor may register the personal POS platform by storing, e.g., the serial number of the platform and/or other uniquely identifying information and the encryption/decryption protocols or keys determined for establishing secure communications with the personal POS platform to bind the personal POS platform to the certification and register the platform (element 420).

Once the registration processor successfully registers the personal POS platform, the registration may be available to the interchange vendor and/or the payment service processor for verification of the registration to validate use of the personal POS platform for use in payment processing. In some embodiments, payment processing with a personal POS platform is only valid with a payment instrument that is also registered for use with the personal POS platform. So the registration processor may communicate with a payment instrument via a card reader of the personal POS platform during a registration procedure to register the payment instrument and to associate the payment instrument with the platform based upon a cryptogram received from the payment instrument via the platform during the registration procedure (element 425).

Thereafter, the registration processor may process a payment transaction with the payment instrument (element 430). Processing the payment may involve validating a registration of the personal POS platform, validating an association between the payment instrument and the personal POS platform, and transmitting information about the transaction to the bank that issued the payment instrument for approval of the payment transaction. If the registration of the personal POS platform is validated, the registration of the payment instrument is validated, and the bank that issued the payment instrument approves the transaction, the bank may process the payment to complete the transaction.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

Further embodiments may include an apparatus to register a personal point of sale (POS) device. The apparatus may comprise a processing device comprising an application processor, a secure element agent, and a network communications device; a card reader; and a secure element coupled with the card reader and the secure element agent, the secure element to comprise logic to register the apparatus as a personal POS device, wherein the logic to register comprises logic to communicate with a registration processor to establish a secure communication channel, to access a secure data storage to obtain platform information, and to transmit the platform information to the registration processor to identify a certification for the personal POS device.

In some embodiments, the secure element comprises logic to communicate with a payment instrument via the card reader during registration, the secure element to receive an encrypted message from the card reader and to transmit the encrypted message to the registration processor via the secure communication channel during registration to bind the payment instrument to the apparatus. In some embodiments, the secure element comprises logic to activate a near field communication radio to register a payment instrument. And, in some embodiments, the card reader comprises one or more of a near field communication radio and antenna, a magnetic medium reader, an optical medium reader, and contacts for a contacted connection to communicate with the payment instrument.

Another embodiment comprises one or more tangible computer-readable non-transitory storage media comprising computer-executable instructions. The computer-executable instructions may be operable to, when executed by at least one computer processor, enable the at least one computer processor to implement a method. The method may involve communicating, by a secure element of a platform with a registration processor, to initiate registration of the platform as a certified personal Point of Sale (POS) device; communicating, by the platform, with a registration processor to establish a secure communication channel; interacting, by the secure element with a secure data storage, to determine platform information of the platform; and transmitting, by the secure element, the platform information to the registration processor to identify the platform as a certified personal POS device.

In some embodiments, the method further comprises activating a near field communication radio during registration to interact with an EMV® (Europay, MasterCard and Visa) card to associate the EMV® card with the platform and to register the EMV® card as a valid payment instrument for processing payments with the platform. In some embodiments, the method further comprises processing payment for a transaction by transmitting platform information and a cryptogram received from a registered payment instrument via a card reader. And, in some embodiments, transmitting platform information comprises transmitting one or more of a manufacturer name, a platform model number, a stock keeping unit number, and a platform identification number.

Further embodiments may include a method to register a personal point of sale (POS) device. The method may involve communicating, by a secure element of a platform with a registration processor, to initiate registration of the platform as a certified personal POS device; communicating, by the platform, with a registration processor to establish a secure communication channel; interacting, by the secure element with a secure data storage, to determine platform information of the platform; and transmitting, by the secure element, the platform information to the registration processor to identify a certification for a personal POS device associated with the platform.

In some embodiments, the method may further comprise activating a near field communication radio during registration to interact with an EMV® (Europay, MasterCard and Visa) card to associate the EMV® card with the platform and to register the EMV® card as a valid payment instrument for processing payments with the platform. In some embodiments, the method may further comprise processing payment for a transaction by transmitting platform information and a cryptogram received from a registered payment instrument via a card reader. And, in some embodiments, transmitting platform information comprises transmitting one or more of a manufacturer name, a platform model number, a stock keeping unit number, and a platform identification number.

Further embodiments may include a system to register a personal point of sale (POS) device. The system may comprise a processing device comprising an application processor, a secure element agent, and a network communications device; a card reader; and a secure element coupled with the card reader and the secure element agent, the secure element to comprise logic to register the system as a personal POS device, wherein the logic to register comprises logic to communicate with a registration processor server to establish a secure communication channel, to access a secure data storage to obtain platform information, and to transmit the platform information to the registration processor server to identify a certification for a personal POS device associated with the system; a memory coupled with the application processor; medium access control logic coupled with the memory to determine and decode wireless communications; one or more antennas; and one or more radios coupled with corresponding ones of the one or more antennas to transmit and receive wireless communications.

In some embodiments, the secure element comprises logic to communicate with a payment instrument via the card reader during registration to associate the payment instrument with the system, the secure element to receive an encrypted message from the card reader and to transmit the encrypted message to the registration processor server via the secure communication channel during registration. In some embodiments, the secure element comprises logic to activate a near field communication radio to register a payment instrument. And, in some embodiments, the card reader comprises one or more of a near field communication radio and antenna to communicate with the payment instrument, a magnetic medium reader, an optical medium reader, and contacts for a contacted connection to communicate with the payment instrument.

Further embodiments may include an apparatus to register a personal point of sale (POS) device. The apparatus may comprise a means for communicating, by a secure element of a platform with a registration processor, to initiate registration of the platform as a certified personal POS device; a means for communicating, by the platform, with a registration processor to establish a secure communication channel; a means for interacting, by the secure element with a secure data storage, to determine platform information of the platform; and a means for transmitting, by the secure element, the platform information to the registration processor to identify a certification for a personal POS device associated with the apparatus.

In some embodiments, the apparatus may further comprise a means for activating a near field communication radio during registration to interact with an EMV® (Europay, MasterCard and Visa) card to associate the EMV® card with the platform and to register the EMV® card as a valid payment instrument for processing payments with the platform. In some embodiments, the apparatus may further comprise a means for processing payment for a transaction by transmitting platform information and a cryptogram received from a registered payment instrument via a card reader. And, in some embodiments the means for transmitting platform information comprises a means for transmitting one or more of a manufacturer name, a platform model number, a stock keeping unit number, and a platform identification number.

Another embodiment comprises an apparatus to register a personal point of sale (POS) device. The apparatus may comprise a memory comprising a database; and a processing device comprising a processor and a network communications device, the processing device comprising logic to receive a communication from a platform comprising platform information, to perform a security protocol to establish a secure communication channel with the platform, to determine an existence of the certification for the platform as the personal POS device in the database based upon the platform information, and to register the platform in response to locating the certification of the platform.

In some embodiments, the processing device comprises logic to communicate with a payment instrument via a card reader during a registration procedure to register the payment instrument and to associate the payment instrument with the platform based upon a cryptogram received from the payment instrument via the platform during the registration procedure. And, in some embodiments, the processing device comprises logic to process a payment transaction with a payment instrument, the logic to validate a registration of the platform with the apparatus as the personal POS device and to validate an association between the payment instrument and the platform.

Further embodiments may include one or more tangible computer-readable non-transitory storage media comprising computer-executable instructions operable to, when executed by at least one computer processor, enable the at least one computer processor to implement a method. The method may involve receiving a communication from a platform comprising platform information; performing a security protocol to establish a secure communication channel with the platform; determining an existence of the certification for the platform as a personal point of sale (POS) device in the database based upon the platform information; and registering the platform in response to locating the certification of the platform.

In some embodiments, the method further comprises communicating with a payment instrument via a card reader during a registration procedure to register the payment instrument and to associate the payment instrument with the platform based upon a cryptogram received from the payment instrument via the platform during the registration procedure. And, in some embodiments, the method further comprises processing a payment transaction with a payment instrument, the logic to validate a registration of the platform with the apparatus as the personal POS device and to validate an association between the payment instrument and the platform.

Further embodiments may include a method to register a personal point of sale (POS) device. The method may involve receiving a communication from a platform comprising platform information; performing a security protocol to establish a secure communication channel with the platform; determining an existence of the certification for the platform as a personal point of sale (POS) device in the database based upon the platform information; and registering the platform in response to locating the certification of the platform.

In some embodiments, the method further comprises communicating with a payment instrument via a card reader during a registration procedure to register the payment instrument and to associate the payment instrument with the platform based upon a cryptogram received from the payment instrument via the platform during the registration procedure. And, in some embodiments, the method further comprises processing a payment transaction with a payment instrument, the logic to validate a registration of the platform with the apparatus as the personal POS device and to validate an association between the payment instrument and the platform.

Another embodiment comprises a system to register a personal point of sale (POS) device. The system may comprise a memory comprising a database; and a processing device comprising a processor and a network communications device, the processing device comprising logic to receive a communication from a platform comprising platform information, to perform a security protocol to establish a secure communication channel with the platform, to determine an existence of the certification for the platform as the personal POS device in the database based upon the platform information, and to register the platform in response to locating the certification of the platform; medium access control logic coupled with the memory to determine and decode wireless communications; one or more antennas; and one or more radios coupled with corresponding ones of the one or more antennas to transmit and receive wireless communications.

In some embodiments, the processing device comprises logic to communicate with a payment instrument via a card reader during a registration procedure to register the payment instrument and to associate the payment instrument with the platform based upon a cryptogram received from the payment instrument via the platform during the registration procedure. And, in some embodiments, the processing device comprises logic to process a payment transaction with a payment instrument, the logic to validate a registration of the platform with the apparatus as the personal POS device and to validate an association between the payment instrument and the platform.

Another embodiment comprises an apparatus to register a personal point of sale (POS) device. The apparatus may comprise a means for receiving a communication from a platform comprising platform information; a means for performing a security protocol to establish a secure communication channel with the platform; a means for determining an existence of the certification for the platform as a personal POS device in the database based upon the platform information; and a means for registering the platform in response to locating the certification of the platform.

In some embodiments, the apparatus may further comprise a means for communicating with a payment instrument via a card reader during a registration procedure to register the payment instrument and to associate the payment instrument with the platform based upon a cryptogram received from the payment instrument via the platform during the registration procedure. And, in some embodiments, the apparatus may further comprise a means for processing a payment transaction with a payment instrument, the logic to validate a registration of the platform with the apparatus as the personal POS device and to validate an association between the payment instrument and the platform.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. An apparatus for a point of sale transaction, the apparatus comprising:
a processor;
a secure element; and
a near field communications (NFC) circuitry,
the apparatus to communicate payment information and a public key to register a payment instrument as a valid payment instrument;
the secure element operably coupled with the NFC circuitry to communicate a cryptogram associated with the payment instrument to process a transaction, wherein the cryptogram comprises a random number and information, wherein the random number uniquely identifies the payment instrument; and
the apparatus to receive an approval of a payment via the payment instrument.

2. The apparatus of claim 1, wherein the secure element comprises logic circuitry to cause the NFC circuitry to transmit the cryptogram.

3. The apparatus of claim 1, wherein the NFC circuitry comprises a near field communication radio and an antenna.

4. The apparatus of claim 1, wherein the NFC circuitry and the secure element reside on a same die.

5. The apparatus of claim 1, wherein the NFC circuitry and the secure element reside in a same chip package.

6. The apparatus of claim 1, further comprising Bluetooth communications circuitry.

7. The apparatus of claim 1, further comprising a cellular radio coupled with an antenna.

8. The apparatus of claim 1, further comprising a Wi-Fi radio coupled with an antenna array.

9. The apparatus of claim 1, further comprising a display with a touch screen.

10. The apparatus of claim 1, further comprising audio input-output (I/O).

11. The apparatus of claim 1, further comprising a secure element agent to secure communications with the secure element.

12. The apparatus of claim 1, further comprising displaying an indication of the approval.

13. A computer-readable non-transitory storage medium comprising computer-executable instructions operable to, when executed by at least one processor, enable the at least one processor to:
communicate payment information and a public key to register a payment instrument as a valid payment instrument;
communicate, via a secure element operably coupled with near field communications (NFC) circuitry, a cryptogram associated with the payment instrument to process a transaction, wherein the cryptogram comprises a random number and information, wherein the random number uniquely identifies the payment instrument; and
receive an approval of a payment for the transaction.

14. The computer-readable non-transitory storage medium of claim 13, the at least one processor to cause the NFC circuitry to transmit the cryptogram.

15. The computer-readable non-transitory storage medium of claim 13, wherein the NFC circuitry comprises a near field communication radio and an antenna.

16. The computer-readable non-transitory storage medium of claim 13, wherein the NFC circuitry and the secure element reside on a same die, in a same chip package, or a combination thereof.

17. The computer-readable non-transitory storage medium of claim 13, the at least one processor to further communicate via Bluetooth communications circuitry, a cellular radio coupled with an antenna, a Wi-Fi radio coupled with an antenna array, or a combination thereof.

18. The computer-readable non-transitory storage medium of claim 13, the at least one processor to interact with a user via a display with a touch screen.

19. The computer-readable non-transitory storage medium of claim 13, the at least one processor to communication a message via an audio input-output (I/O).

20. The computer-readable non-transitory storage medium of claim 13, further comprising displaying an indication of the approval.

* * * * *